United States Patent [19]

Tran et al.

[11] Patent Number: 4,539,032
[45] Date of Patent: Sep. 3, 1985

[54] $SF_6$ PROCESS FOR DEHYDRATION OF FLUORIDE GLASSES

[75] Inventors: Danh C. Tran, Rockville; Chester Fisher, Columbia, both of Md.

[73] Assignee: Geo-Centers, Inc., Newton, Mass.

[21] Appl. No.: 637,433

[22] Filed: Aug. 3, 1984

[51] Int. Cl.$^3$ .................. C03B 5/225; C03B 5/00; C03C 3/18
[52] U.S. Cl. .......................... 65/32; 65/134; 501/40
[58] Field of Search .............. 65/32, 33, 134, 3.13; 501/40, 37, 904

[56] References Cited

U.S. PATENT DOCUMENTS 3,656,924  4/1972  Chapman et al. ............. 65/134 X
4,141,741  2/1979  Lucas et al. ..................... 501/40
4,341,873  7/1982  Robinson et al. ............. 501/37 X

FOREIGN PATENT DOCUMENTS 103441   3/1984  European Pat. Off. ............... 65/2
59-87406 5/1984  Japan ................................ 65/1
2061910  5/1981  United Kingdom ............... 501/40

Primary Examiner—Kenneth M. Schor
Attorney, Agent, or Firm—Louis Orenbuch

[57] ABSTRACT

A method of making fluoride glasses produces fluoride glass having such low OH and low oxide content that the extrinsic optical absorbance caused by the OH vibration at $2.9\mu$ is eliminated or substantially reduced. In the method, a glass charge is placed in a capped crucible and dry argon gas is caused to flow through the capped crucible while the temperature is raised to melt the charge. Thereafter, while the dry argon gas flow is continued, the temperature in the furnace is held constant for a time sufficient to obtain a homogenous melt in which all crystalline materials are dissolved. The temperature is then lowered to a value between the glass crystalization temperature and the sublimation temperature of $ZrF_4$ and then, at isothermal conditions, the flow of dry argon gas is replaced by a flow of $SF_6$ gas or by a flow of $CF_4$ gas. At the lowered temperature, the $SF_6$ or $CF_4$ gas flow is maintained for a time sufficient to eliminate or greatly reduce OH and oxides in the glass melt. Thereafter, the melt is allowed to cool in a still water-free environment.

2 Claims, 2 Drawing Figures

SF₆ PROCESS FOR DEHYDRATION OF FLUORIDE GLASSES

U.S. GOVERNMENT RIGHTS IN THE INVENTION

This invention was made in the performance by Geo-Centers, Inc., of work under Naval Research Laboratory contracts N00014-82-C-2137 and N00014-82-C-2326. The United States of America has certain rights in the invention arising out of its support of that work.

FIELD OF THE INVENTION

This invention relates in general to glass making and more particularly pertains to the making of optical glass having improved low loss light transmission properties.

The invention resides in a process for making fluoride glasses having such low hydroxide (OH) and low oxide content that the extrinsic optical absorbance caused by the OH vibration at 2.9$\mu$ which is usually associated with fluoride glasses, is substantially reduced. One important use for fluoride glasses made by the process of the invention is as low loss optical fibers for light transmission because those fibers have minimum intrinsic optical attenuation in the 1 to 4.5$\mu$ region.

PRIOR ART BACKGROUND

A process now used to prepare metal halide glasses having negligible OH absorption at 2.9$\mu$ fuses a mixture of ultra pure reagents such as zirconium tetrafluoride ($ZrF_4$), barium fluoride ($BaF_2$), and thorium fluoride ($ThF_4$), in a platinum or gold crucible maintained at 900° C. in an atmosphere of hydrogen fluoride (HF) and an inert gas. The hydrogen fluoride atmosphere is then replaced by a rectifying atmosphere of carbon tetrachloride ($CCl_4$) and an inert gas and the melt is heated an additional 3 to 6 hours to remove the discoloration produced in the first stage of the process. In a subsequent stage the glass is molded, reheated, and cooled in the carbon tetrachloride and inert gas atmosphere.

In another process now used to make low OH content glasses, ammonium bifluoride ($NH_4HF_2$) is mixed with the reagent metal fluorides. In this process, the bifluoride decomposes in the heating and fusing stage and generates an atmosphere of hydrogen fluoride. Discloration of the glass does not occur in this process and, consequently, subsequent rectification is not necessary.

The first described prior art process causes a dark discoloration of the glass melt during the HF processing stage. The removal of that discoloration requires subsequent processing to rectify. Another disadvantage of that process is that processing with $CCl_4$ can lead to contamination and discoloration of the melt from crucible metal chlorides produced by the attack of nascent chlorine on the crucible material. If, for example, the crucible is of platinum, the nascent chloride tends to form platinum chloride. Further, where the reagent oxides and hydroxides in the melt are not entirely converted to fluorides in the HF treatment stage, the residual oxides and hydroxides may experience chlorination during $CCl_4$ rectification. If that occurs, it introduces an additional component to the glass composition with subsequent loss in glass stability.

The process in which ammonium bifluoride is used to generate an atmosphere of HF has several disadvantages associated with adding ammonium bifluoride to the high purity reagents. As previously stated, an important use for fluoride glasses is for low loss optical fibers having minimum intrinsic optical attenuation in the 1 to 4.5$\mu$ region. That wavelength region is also the absorbance region for some transition and rare earth elements. For some of those impurities, substantial absorbance occurs even at the sub-ppb (sub- parts per billion) concentration level. The ammonium bifluoride now available from commercial sources is not of sufficient purity and its addition to the glass system introduces impurity contamination with a consequent increase in the optical loss of the glass.

In addition to impurity contamination another drawback arising from the use of ammonium bifluoride results from the nature of its decomposition products. At high temperatures, ammonium bifluoride decomposes into hydrogen fluoride and ammonium fluoride ($NH_4F$) as indicated by the following equation

$$NH_4HF_2 \rightarrow HF + NH_4F$$

The ammonium fluoride sublimes and condenses on the cooler surfaces within and surrounding the furnace with consequent contamination of the area. Processing of fluoride glasses with ammonium bifluoride in confined or controlled environments such as gloveboxes and clean rooms, results in contamination of the environment by the ammonium fluoride condensate and creates a source of extrinsic scattering loss for glasses quenched in that contaminated environment.

OBJECT OF THE INVENTION

The main objective of the invention is to provide a method of making low loss optical fluoride glasses that has advantages over prior art processes.

THE METHOD OF THE INVENTION

In the method of the invention, it is highly desirable, if not imperative, that the process by carried out in as water-free an environment as is feasible. Consequently, the heating chamber should be sealed or kept at a positive pressure to prevent the entry of moisture. In the method, a glass charge is placed in a crucible and the crucible is covered with a cap that forms a space over the charge. The system is preferably then closed and purged by a flow of dry argon gas to remove any moisture initially present. While dry argon gas flows, the temperature in the heating chamber is raised to melt the charge. Thereafter, the flow of dry argon gas through the crucible is maintained while the temperature in the heating chamber is held constant for a time sufficient to obtain a homogeneous melt in which all crystalline materials are dissolved. The temperature is then lowered to a value between the glass crystallization temperature and the sublimation temperature of $ZrF_4$. Preferably, the flow of dry argon gas is continued while the temperature is lowered. In any event, while lowering the temperature, an atmosphere should be maintained over the melt which excludes the entry of moisture into the crucible. Then, at the lowered temperature, at isothermal conditions $SF_6$ gas or $CF_4$ gas is caused to flow into the capped space above the melt in the crucible and that flow of gas is maintained until the OH and oxides in the melt have been eliminated or substantially reduced. Thereafter, the melt is allowed to cool in a still water-free environment.

ADVANTAGES OF THE INVENTION

Processing fluoride glass melts with $SF_6$ gas or with $CF_4$ gas while the temperature is held within the range from glass crystallization temperature to the temperature at which $ZrF_4$ sublimes has a number of distinct advantages over the prior art $HF/CCl_4$ and ammonium bifluoride processes. Among those advantages are : (1) $SF_6$ and $CF_4$ are non-toxic stable gases at room temperature—unlike HF, $CCl_4$, and $NH_4HF_2$—and consequently $SF_6$ and $CF_4$ possess an inherent chemical stability that is conducive to their safe handling and storage; (2) $SF_6$ and $CF_4$, unlike HF, successfully dehydroxylate fluoride glass melts without causing glass discolorization; (3) $SF_6$ and $CF_4$, when used within the above noted temperature range, do not, unlike $CCl_4$, cause significant deterioration of platinum or gold which are the common materials of crucibles for melting fluoride glass; (4) the use of $SF_6$ and $CF_4$ over a glass melt need not lead to an increase in transition or rare earth impurities because $SF_6$ gas and $CF_4$ gas are easily purified and metal fluorides are not gasses at room temperature; (5) unlike $NH_4HF_2$, the decomposition products of $SF_6$ or of $CF_4$ are not crystalline materials and therefore do not serve as epitaxial growth centers or solid nuclei in a fluoride glass melt; and (6) because $SF_6$ and $CF_4$ thermally decompose to $F_2$, metal hydroxides and oxides in the melt are converted to fluorides rather than to the chlorides produced by the $CCl_4$ process.

THE DRAWINGS

FIG. 1 schematically shows an arrangement of apparatus for carrying out the method of making fluoride glass in accordance with the invention.

FIG. 2, in trace A, shows the infra-red spectragram of a fluoride glass sample made by the ammonium bifluoride process and in trace B shows the infra-red spectragram for the same glass sample after that sample was remelted and processed with $SF_6$ in accordance with the invention.

DETAILED DESCRIPTION OF THE INVENTION

Figure 1:
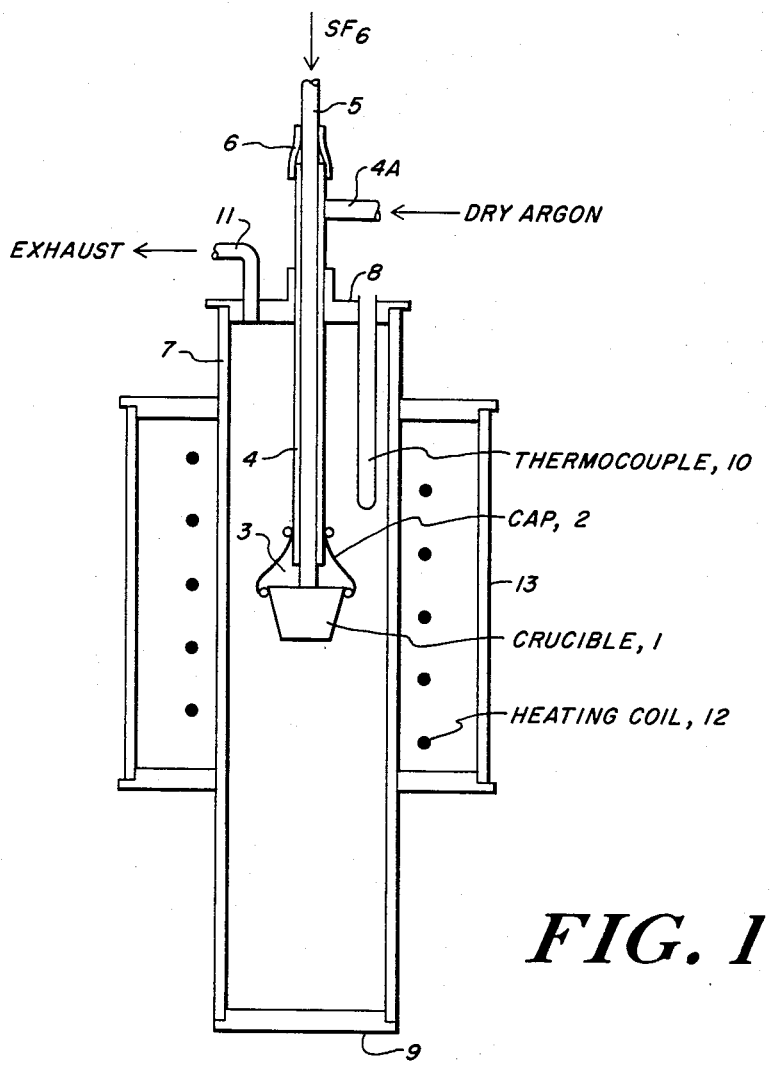

FIG. 1 schematical depicts an arrangement of apparatus suited to carrying out the process of the invention. In that process, the crucible 1 is charged with a mixture of raw materials from which the fluoride glass is to be made. Alternatively, the crucible may be charged with a fluoride glass having a substantial content of OH and/or oxides. The crucible can be of platinum or of gold, as is usual in the making of fluoride glasses. The crucible is covered by a cap 2 which provides a chamber 3 over the melt in the crucible. The cap has a central aperture into which a tube 4 extends. A source of dry argon gas is connected to an inlet 4A of tube 4 in a manner permitting regulation of the flow of that gas into the tube. Situated within the tube 4 and extending into chamber 3 is a tube 5 which is connected through suitable flow regulation means to a source of sulfur hexachloride $SF_6$) gas. To prevent dry argon gas from escaping out the upper end of tube 4, that end of the tube is closed off by a seal 6. The capped crucible and adjacent portions of the tubes 4 and 5 are situated in a hollow cylindrical tubular muffle 7 whose upper and lower ends are closed by lids 8 and 9 which prevent moisture from entering the muffle. The crucible is positioned close to a thermocouple 10 which is used to monitor the temperature in the vicinity of the crucible. Situated in the upper lid 8 of the muffle is an exhaust pipe 11 through which gases and vapors can exit the muffle.

Surrounding the muffle is a heating coil 12 which can be a resistance wire or the heat can be produced by an induction coil. The heating coil is enclosed in a housing 12 and preferably insulation is provided in the housing to reduce heat losses.

In carrying out the process of the invention, the charge is placed in the crucible and the crucible is positioned within the muffle. The sealed system is then purged with dry argon gas which enters through tube 4 and exhausts through tube 11. With a continuous flow of dry argon gas through the crucible, the temperature in the muffle is raised by the heating coil to produce a melt in the crucible. Depending upon the composition of the charge in the crucible, that temperature will be about 800° C. While continuing the flow of dry argon gas, a constant temperature is then maintained in the muffle for a sufficient time to obtain a homogeneous melt in which all crystalline materials in the charge have dissolved. While maintaining the flow of dry argon gas, the temperature in the muffle is lowered to a value between the glass crystalization temperature and the sublimation temperature of $ZrF_4$. At isothermal conditions, a flow of $SF_6$ gas is introduced through tube 5 into capped chamber 3, over the melt. At this time, the flow of dry argon gas is reduced or entirely cut off. The cap 2 is sufficiently loose to permit the gas in chamber 3 to flow out into the muffle and exhaust through tube 11. While at the lowered temperature, the $SF_6$ gas flow is maintained for a time sufficient to eliminate or substantially reduce OH and/or residual oxides in the glass melt. At the end of this period, the crucible is lowered in the muffle to a cooler but still water-free zone where the melt is quenched, cast, or molded to the desired shape.

It has been ascertained that in the foregoing described method of the invention, $CF_4$ gas can be substituted in place of the $SF_6$ gas with substantially the same result in eliminating or reducing OH and oxides in the melt without discoloring the glass.

Figure 2:
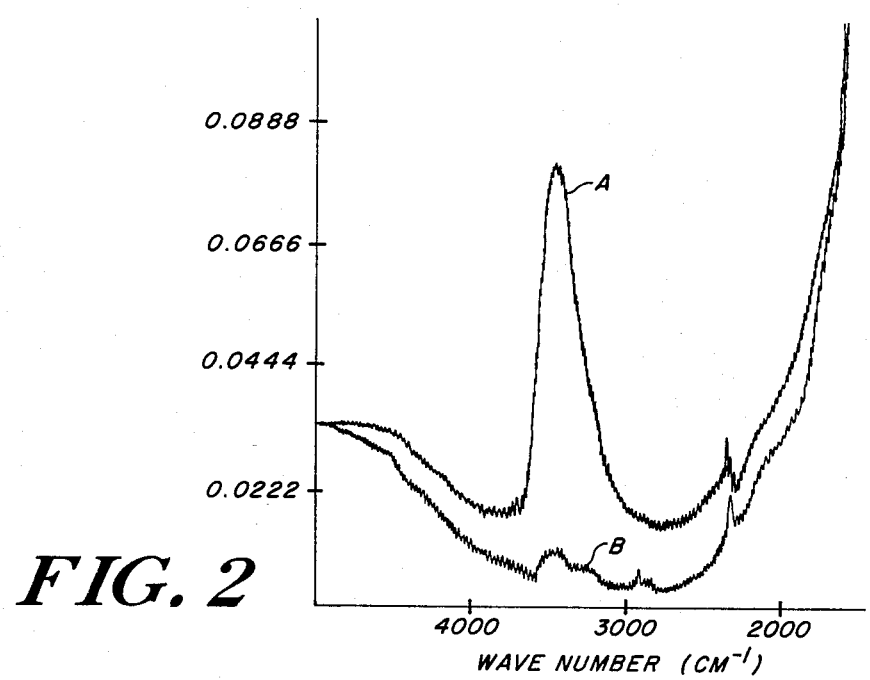

FIG. 2 is a graph in which trace A indicates the infrared spectra of a fluoride glass sample made by the ammonium bifluoride process. The large absorption band around 3450 $cm^{-1}$ (i.e. 2.9$\mu$) is attributed to the bulk OH stretching vibration. Trace B is the infra-red spectragram for the same glass sample after that sample had been remelted and processed, using the $SF_6$ process, in accordance with the invention. Both samples were of the same thickness. In trace B the residual peak in the band around 3450 $cm^{-1}$ is believed to be due to OH surface absorption and to an error in the instrument used to determine these spectragraphs.

We claim:
1. A method of making fluoride glasses having low OH and low oxide content, comprising the steps of:
   (i) placing a fluoride glass charge containing $ZrF_4$ a crucible having a cap extending over the charge said cap providing a capped space above the charge and said cap being shaped such that gases can be fed into and out of the capped crucible,
   (ii) disposing the capped charged crucible in a heating chamber,
   (iii) causing dry argon gas to flow into through, and then out of the capped crucible while raising the temperature to thereby melt the charge in the crucible,

(iv) continuing the flow of dry argon gas into through, and then out of the capped crucible while maintaining a constant temperature for a sufficient time to obtain a homogeneous melt in which all crystalline materials are dissolved, (v) while maintaining a water-free atmosphere over the melt, lowering the temperature in the heating chamber to a temperature between the glass crystallization temperature and a temperature near the sublimation temperature of $ZrF_4$, (vi) maintaining said lowered temperature while causing a flow of a gas selected from the group of $SF_6$ and $CF_4$ to enter the capped space above the melt and flow therethrough for a time sufficiently long to substantially reduce OH and oxides in the glass melt, and (vii) cooling the crucible and its contents while maintaining them in a water-free environment.

2. The method according to claim 1, further including the step of (viii) purging the heating chamber by causing dry argon gas to flow therethrough before raising the temperature to melt the charge.

* * * * *

UNITED STATES PATENT OFFICE
CERTIFICATE OF CORRECTION

Patent No. 4,539,032      Dated September 3, 1985

Inventor(s) Danh C. Tran and Chester Fisher

It is certified that error appears in the above-identified patent and that said Letters Patent are hereby corrected as shown below:

In claim 1 at column 4, line 58, after "$ZrF_4$" insert --into--

Signed and Sealed this

Third Day of December 1985

[SEAL]

Attest:

DONALD J. QUIGG

Attesting Officer      Commissioner of Patents and Trademarks